United States Patent
Brethour et al.

(10) Patent No.: US 6,188,410 B1
(45) Date of Patent: Feb. 13, 2001

(54) SYSTEM FOR PROCESSING VERTICES FROM A GRAPHICS REQUEST STREAM

(75) Inventors: Vernon Brethour, Owens Cross Roads; William Lazenby, Harvest, both of AL (US)

(73) Assignee: 3DLabs Inc. Ltd., Hamilton (BM)

( * ) Notice: Under 35 U.S.C. 154(b), the term of this patent shall be extended for 0 days.

(21) Appl. No.: 09/353,432

(22) Filed: Jul. 15, 1999

Related U.S. Application Data

(60) Provisional application No. 60/093,233, filed on Jul. 17, 1998.

(51) Int. Cl.[7] .............................. G06F 15/00; G06T 1/00
(52) U.S. Cl. ......................... 345/501; 345/514; 345/522
(58) Field of Search ................................... 345/501–503, 345/507–509, 514, 522

(56) References Cited

U.S. PATENT DOCUMENTS

| | | | |
|---|---|---|---|
| 4,434,437 | 2/1984 | Strolle et al. | 358/140 |
| 4,615,013 | 9/1986 | Yan et al. | 364/521 |
| 4,646,232 | 2/1987 | Chang et al. | 523/445 |

(List continued on next page.)

FOREIGN PATENT DOCUMENTS

| | | |
|---|---|---|
| 0 311 798 A2 | 4/1989 | (EP) . |
| 0 397 180 A2 | 11/1990 | (EP) . |
| 0 438 194 A2 | 7/1991 | (EP) . |
| 0 448 286 A2 | 9/1991 | (EP) . |
| 0 463 700 A2 | 1/1992 | (EP) . |
| 0 566 229 A2 | 10/1993 | (EP) . |
| 0 627 682 A1 | 12/1994 | (EP) . |
| 0 631 252 A2 | 12/1994 | (EP) . |
| 0 693 737 A2 | 1/1996 | (EP) . |
| 0 734 008 A1 | 9/1996 | (EP) . |
| 0 735 463 A2 | 10/1996 | (EP) . |
| 0 810 553 A2 | 12/1997 | (EP) . |
| 0 817 009 A2 | 1/1998 | (EP) . |
| 0 825 550 A2 | 2/1998 | (EP) . |
| 0 840 279 A2 | 5/1998 | (EP) . |
| WO 86/07646 | 12/1986 | (WO) . |
| WO 92/00570 | 1/1992 | (WO) . |
| WO 93/06553 | 4/1993 | (WO) . |
| WO 97/21192 | 6/1997 | (WO) . |

OTHER PUBLICATIONS

Iwashita, et al., "A Fine Grained Data Flow Machine and Its Concurrent Execution Mechanism" NEC Res. & Develop., No. 93, Apr. 1989, pp. 63–72.

Fujita, et al., "A Dataflow Image Processing System TIP–4", Proceedings of the 5th International Conference on Image Analysis and Processing, pp. 735–741.

Rathman, et al., "Processing the New World of Interactive Media", IEEE Signal Processing Magazine 1053–5888/98/510.00 Copyright Mar. 1998, vol. 15, No. 2, XP–002121705, pp. 108–117.

IBM Technical Disclosure Bulletin "Effective Cache Mechanism for Texture Mapping" vol. 39, No. 12, Dec. 1996, XP–002065152, pp. 213, 215 and 217.

(List continued on next page.)

*Primary Examiner*—Kee M. Tung
(74) *Attorney, Agent, or Firm*—Groover & Associates; Robert Groover; Betty Formby

(57) ABSTRACT

An apparatus for processing a graphics request stream begins processing subsequent vertex data while processing previous vertex data. To that end, the apparatus has a vertex assembler having an input for receiving graphics requests, and a processor (coupled to the vertex assembler) for processing received graphics requests. The processor provides a headstart signal to the vertex assembler to indicate that the processor is processing a new graphics request. Upon receipt of the headstart signal, the vertex assembler causes the processor to restart processing of the new graphics request if the new request is determined to have not been properly assembled.

21 Claims, 3 Drawing Sheets

U.S. PATENT DOCUMENTS

| | | | |
|---|---|---|---|
| 4,908,780 | 3/1990 | Priem et al. | 364/521 |
| 4,918,626 | 4/1990 | Watkins et al. | 364/522 |
| 4,991,122 | 2/1991 | Sanders | 364/521 |
| 5,107,415 | 4/1992 | Sato et al. | 395/800 |
| 5,123,085 | 6/1992 | Wells et al. | 395/121 |
| 5,239,654 | 8/1993 | Ing-Simmons et al. | 395/800 |
| 5,287,438 | 2/1994 | Kelleher | 395/132 |
| 5,293,480 | 3/1994 | Miller et al. | 395/163 |
| 5,313,551 | 5/1994 | Labrousse et al. | 395/425 |
| 5,363,475 | 11/1994 | Baker et al. | 395/122 |
| 5,371,840 | 12/1994 | Fischer et al. | 395/133 |
| 5,394,524 | 2/1995 | DiNicola et al. | 395/163 |
| 5,398,328 | 3/1995 | Weber et al. | 395/500 |
| 5,408,605 * | 4/1995 | Deering | 395/523 |
| 5,446,479 | 8/1995 | Thompson et al. | 345/139 |
| 5,485,559 | 1/1996 | Sakaibara et al. | 395/133 |
| 5,511,165 | 4/1996 | Brady et al. | 395/200.01 |
| 5,519,823 | 5/1996 | Barkans | 395/143 |
| 5,544,294 | 8/1996 | Cho et al. | 395/141 |
| 5,555,359 | 9/1996 | Choi et al. | 395/141 |
| 5,557,734 | 9/1996 | Wilson | 395/162 |
| 5,561,749 | 10/1996 | Schroeder | 395/120 |
| 5,572,713 | 11/1996 | Weber et al. | 395/500 |
| 5,631,693 | 5/1997 | Wunderlich et al. | 348/7 |
| 5,664,114 | 9/1997 | Krech et al. | 395/200 |
| 5,666,520 | 9/1997 | Fujita et al. | 345/513 |
| 5,684,939 | 11/1997 | Foran et al. | 395/131 |
| 5,701,365 | 12/1997 | Harrington et al. | 382/212 |
| 5,706,481 | 1/1998 | Hannah et al. | 395/519 |
| 5,721,812 | 2/1998 | Mochizuki | 395/110 |
| 5,737,455 | 4/1998 | Harrington et al. | 382/284 |
| 5,757,375 | 5/1998 | Kawase | 345/429 |
| 5,757,385 | 5/1998 | Narayanaswami et al. | 345/505 |
| 5,764,237 | 6/1998 | Kaneko | 345/430 |
| 5,821,950 | 10/1998 | Rentschler et al. | 345/505 |
| 5,841,444 | 11/1998 | Mun et al. | 345/506 |
| 5,870,567 | 2/1999 | Hausauer et al. | 395/281 |
| 5,883,641 | 3/1999 | Krech et al. | 345/505 |
| 5,914,711 | 6/1999 | Mangerson et al. | 345/203 |

OTHER PUBLICATIONS

"Advanced Raster Graphics Architecture" XP–002118066, pp. 890–893.

IBM Technical Disclosure Bulletin "Data Format Conversion: Intel/Non–Intel", vol. 33, No. 1A, Jun. 1990, XP–000117784, pp. 420–427.

IBM Technical Disclosure Bulletin "Address Munging Support in a Memory Controller/PCI Host Bridge for the PowerPC 603 CPU Operating in 32–Bit Data Mode" vol. 38, No. 09, Sep. 1995, XP–000540250, pp. 237–240.

Auel, K., "One frame ahead: frame buffer management for animation and real–time graphics", Presented at Computer Graphics: Online Publications, Pinner, Middlesex, UK, 1988, XP–00749898, pp. 43–50.

Abram, et al., "Efficient Alias–free Rendering using Bit–masks and Look–up Tables", San Francisco, Jul. 22–26, vol. 19, No. 13, 1985, XP–002115680, pp. 53–59.

Schilling, A., "A New and Efficient Antialiasing with Sub-pixel Masks" XP–000562430, pp. 133–141.

Ueda, H., et al., "A Multiprocessor System Utilizing Enhanced DSP's For Image Processing", Central Research Laboratory, Hitachi, Ltd., 1988 IEEE, XP–2028756, pp. 611–620.

Cook, R.L., et al., "The Reyes Imaging Rendering Architecture", Computer Graphics, vol. 21, No. 4, Jul. 1987, XP–000561437, pp. 95–102.

Haeberli, P., et al., "The Accumulation Buffer: Hardware Support for High–Quality Rendering", Computer Graphics, vol. 24, No. 4, Aug. 1990, XP–000604382, pp. 309–318.

Watt, A., et al., "Advanced Animation and Rendering Techniques Theory and Practice", ACM Press, NY, pp. 127–137.

Carpenter, L., "The A–buffer, an Antialiased Hidden Surface Method", Computer Graphics, vol. 18, No. 3, Jul. 1984, pp. 13–18.

* cited by examiner

SYSTEM FOR PROCESSING VERTICES FROM A GRAPHICS REQUEST STREAM

PRIORITY

This application claims priority from U.S. provisional patent application serial No. 60/093,233, filed Jul. 17, 1998, entitled "SYSTEM FOR PROCESSING VERTICES FROM A GRAPHICS REQUEST STREAM" and bearing attorney docket number 1247/A02, the disclosure of which is incorporated herein, in its entirety, by reference.

FIELD OF THE INVENTION

The invention generally relates to computer systems and, more particularly, the invention relates to processing graphics request data for display on a computer display device.

BACKGROUND OF THE INVENTION

Three dimensional graphics request data commonly is processed in a computer system as a plurality of polygons having vertices. Each of the vertices have associated attribute data (e.g., color, transparency, depth, etc . . .) that is utilized to rasterize pixels on a computer display device. The well known OPENGL™ application program interface (available from Silicon Graphics Inc. of Mountain View, Calif.) is a commonly used three dimensional graphics library that may be used for processing three dimensional graphics request data in this manner.

Many computer systems utilizing the OPENGL™ graphics library process vertex data sequentially and, for various reasons noted below, postpone processing of subsequent vertices until a previous vertex is completely processed. For example, a second vertex typically is not processed until an immediately preceding first vertex is completely processed. Among other reasons, this postponement ensures that the received second vertex data is properly assembled and thus, ready for processing. Premature processing of a successive vertex (e.g., processing the second vertex prior to completion of the first vertex) may cause an error condition if such successive vertex is not completely and properly assembled.

It is not uncommon, however, for a successive vertex to be completely assembled prior to completion of processing of a previous vertex. In systems with many processing resources, postponing processing of a completely assembled vertex thus unnecessarily lengthens the time required to process a graphics request stream.

SUMMARY OF THE INVENTION

In accordance with one aspect of the invention, an apparatus for processing a graphics request stream begins processing subsequent vertex data while processing previous vertex data. To that end, the apparatus preferably includes a vertex assembler having an input for receiving graphics requests, and a processor (coupled to the vertex assembler) for processing received graphics requests. The processor provides a headstart signal to the vertex assembler to indicate that the processor is processing a new graphics request. Upon receipt of the headstart signal, the vertex assembler causes the processor to restart processing of the new graphics request if the new request is determined to have not been properly assembled.

In accordance with another aspect of the invention, the apparatus for processing a graphics request stream provides the headstart signal to the vertex assembler to indicate that the processor is processing a new graphics request while it is processing a previous graphics request. After receipt of the headstart signal and completion of processing of the previous graphics request, the vertex assembler causes the processor to restart processing of the new graphics request if the new request is determined to have not been properly assembled.

In preferred embodiments, after receipt of the headstart signal and completion of processing the previous graphics request, the vertex assembler causes the processor to continue processing the new graphics request without restarting if the new request is determined to have been properly assembled.

In accordance with yet another aspect of the invention, an apparatus for processing a graphics request stream having first vertex data followed by second vertex data includes a vertex assembler having an input for successively receiving the first vertex data and the second vertex data, and a processor (coupled to the vertex assembler) for processing the first vertex data and the second vertex data. The vertex assembler assembles the first vertex data prior to assembling the second vertex data. The processor begins processing the second vertex data after beginning but prior to completing the processing of the first vertex data. The vertex assembler directs a message to the processor (after completing processing of the first vertex data) indicating whether the processor must restart processing of the second vertex data.

In preferred embodiments, the message indicates whether the processor may continue processing the second vertex data without restarting. The vertex assembler may include a determiner for determining if the second vertex data was properly assembled when the processor began processing the second vertex data. The message thus may indicate that the processor must restart processing the second vertex data if it is determined that the second vertex data was not properly assembled when the processor began processing the second vertex data. In yet other embodiments of the invention, the apparatus may include a flag indicating that the processor has begun processing the second vertex data.

In still other embodiments of the invention, first vertex data and second data may be processed by processing the assembled first vertex data, and then beginning to process second vertex data prior to completing the processing of the first vertex data. The second vertex data preferably is processed in accordance with a preselected process having a start portion. It then may be determined, after completing the processing of the first vertex data, if the second vertex data was properly assembled when processing of the second vertex data began. If it is determined that the second vertex data was not properly assembled when processing of the second vertex data began, then the second vertex data is reprocessed from the start portion of the preselected process

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
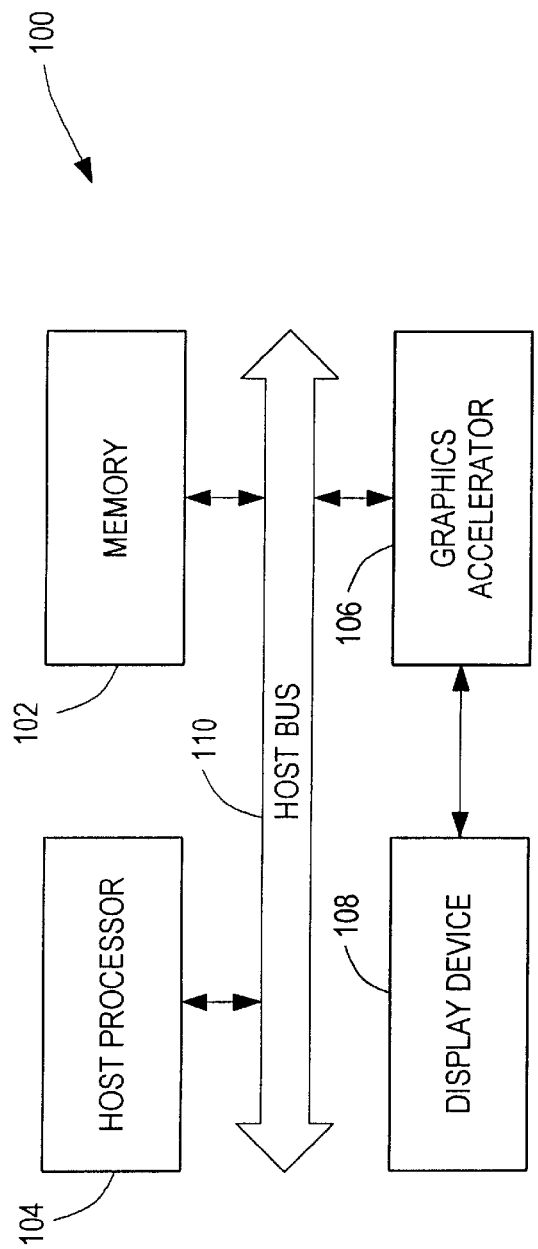
FIG. 1 schematically shows a portion of an exemplary computer system on which preferred embodiments of the invention may be implemented.

FIG. 1 shows a portion of an exemplary computer system 100 on which preferred embodiments of the invention may be implemented. More particularly, the computer system 100 includes a host processor 104 (i.e., a central processing unit) for executing application level programs and system functions, volatile host memory 102 for short term data storage (i.e., random access memory), a graphics accelerator 106 for processing graphics request code in accord with preferred embodiments of the invention, and a bus 110 coupling all of the prior noted elements of the system 100. In addition, the system 100 further includes a display device 108, coupled to the graphics accelerator 106, for displaying the graphics request code processed by the accelerator 106. The graphics accelerator 106 preferably utilizes any well known graphics processing application program interface such as, for example, the OPENGL™ application program interface (available from Silicon Graphics, Inc. of Mountain View, Calif.) for processing three dimensional ("3D") and two dimensional ("2D") graphical request code. In preferred embodiments, the host processor 104 executes a graphical drawing application program such as, for example, the PLANT DESIGN SYSTEM™, available from Intergraph Corporation of Huntsville, Ala.

Figure 2:
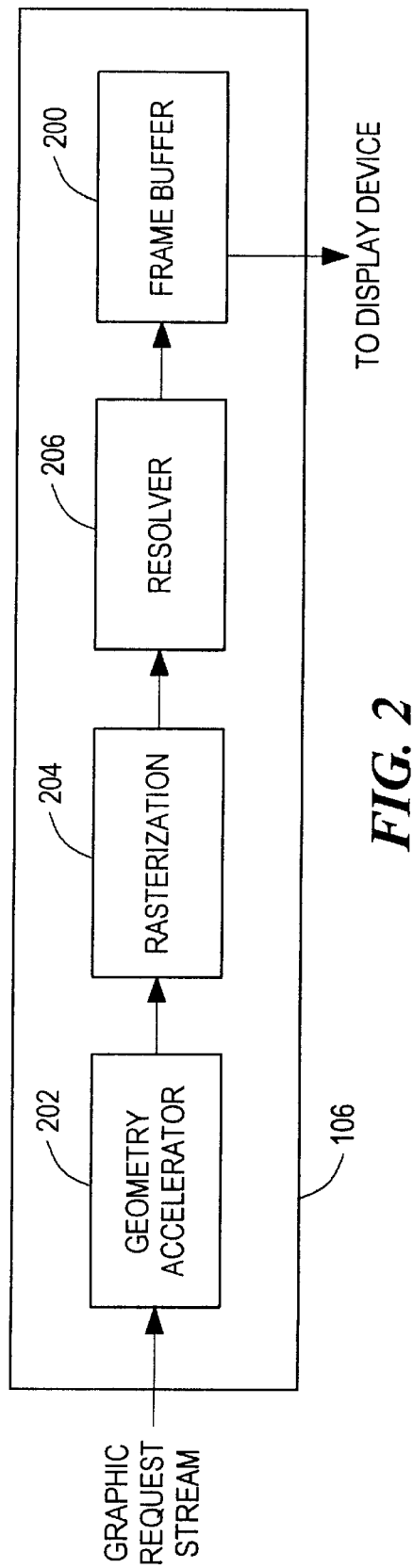
FIG. 2 schematically shows a preferred graphics accelerator that may be utilized in accord with preferred embodiments of the invention.

FIG. 2 shows several elements of the graphics accelerator 106. In preferred embodiments, the graphics accelerator 106 includes a double buffered frame buffer 200 (i.e., having a back buffer and a front buffer) for storing the processed graphics request code in accord with the OPENGL™ interface. Among other things, the graphics accelerator 106 also preferably includes a geometry accelerator 202 for performing geometry operations that commonly are executed in graphics processing, a rasterizer 204 for rasterizing pixels on the display device 108, and a resolver 206 for storing data in the frame buffer 200 and transmitting data from the frame buffer 200 to the display device 108. As noted above, the graphics accelerator 106 preferably is adapted to process both 2D and 3D graphical data. For more information relating to preferred embodiments of the graphics accelerator 106, see, for example, copending patent application entitled "Wide Instruction Word Graphics Processor", filed on even date herewith and naming Vernon Brethour, Gary Shelton, William Lazenby, and Dale Kirkland as inventors, the disclosure of which is incorporated herein, in its entirety, by reference.

Figure 3:
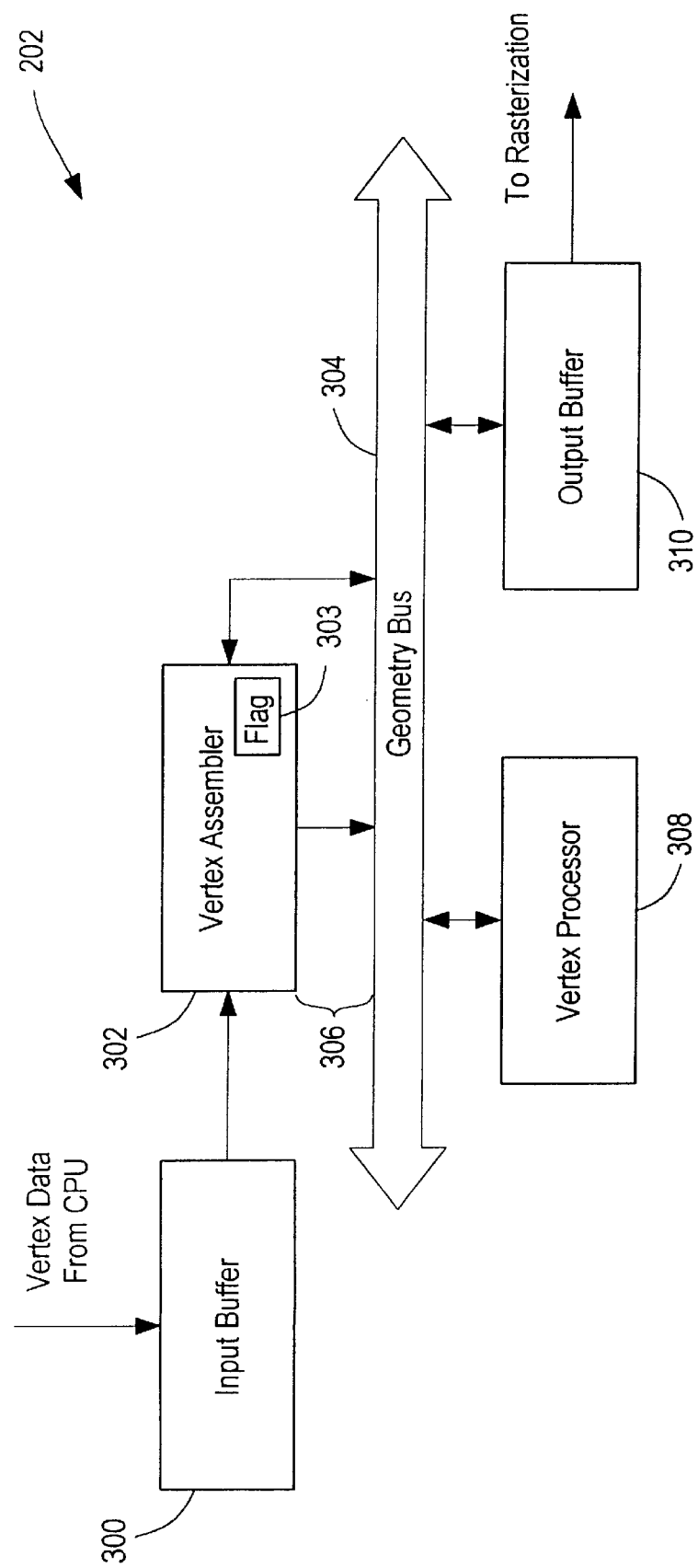
FIG. 3 schematically shows a preferred geometry accelerator that may be utilized in accord with preferred embodiments of the invention.

FIG. 3 schematically shows one embodiment of the geometry accelerator 202 that may be utilized in accord with preferred embodiments of the invention. Among other elements, the geometry accelerator 202 includes an input buffer 300 (e.g., a first-in, first-out buffer) for receiving graphics request code having data representing successive vertices of a primitive, and a vertex assembler 302 for assembling the input graphics request code (see below) received from the input buffer 300. The graphics request code may be generated by executing a graphics application program by the host processor 104.

In accord with preferred embodiments, the vertex assembler 302 retrieves data for each successive vertex from the input buffer 300, and assembles each retrieved vertex into a proper form for transmission onto a geometry bus 304 via an output port 306. The vertex assembler 302 may assemble the received vertex data in accordance with conventional processes. More particularly, the vertex assembler 302 may construct complete and properly formatted vertex input data from partial vertex data. For example, in many graphical computer systems, vertex data may be represented by forty-four different numbers. Fewer than the full forty-four numbers, however, may be properly produced by the host processor 104 (e.g., six numbers), however, to represent a vertex when successive vertices have common attributes. Use of fewer numbers to represent a vertex necessarily reduces bandwidth requirements by compressing data, thus increasing system performance.

The vertex assembler 302 also includes a flag 303 indicating that a "headstart" signal has been received from other portions of the geometry accelerator 202. Details of the flag 303 and headstart signal are discussed below with reference to FIG. 4.

In addition to the input buffer 300, vertex assembler 302, and geometry bus 304, the geometry accelerator 202 also includes a vertex processor 308 for performing intensive math calculations on the assembled vertex data, and an output buffer 310 for temporarily storing the processed vertex data from the vertex processor 308. Among other things, the math calculations may include multiplication operations, reciprocal operations, and addition operations. Once stored in the output buffer 310, the processed vertex data may be transmitted to the rasterizer 204 in accord with conventional processes.

Figure 4:
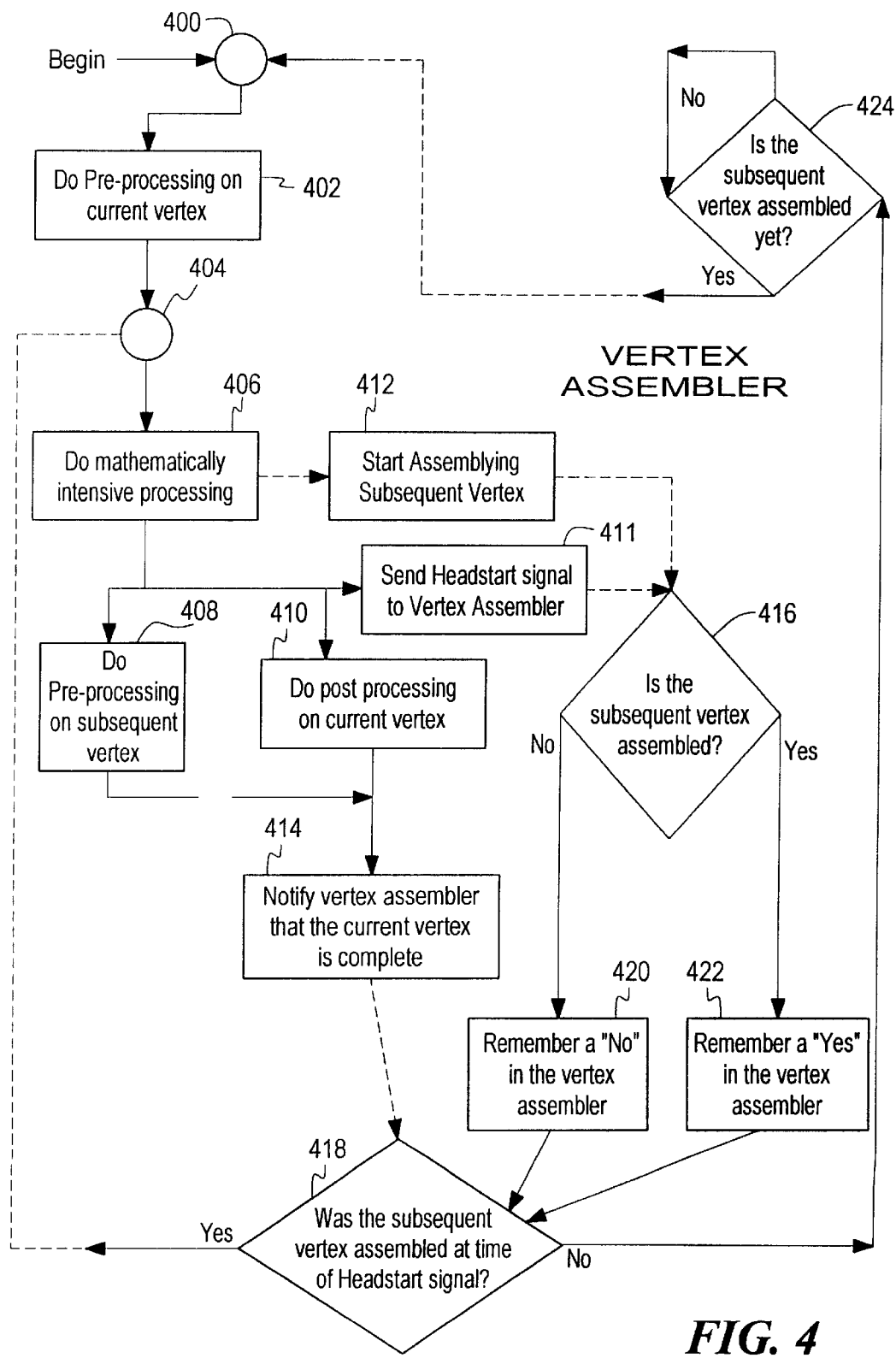
FIG. 4 is a flow chart used by the vertex assembler in conjunction with a vertex processor for processing current and subsequent vertices.

FIG. 4 shows a preferred process of processing graphics request code having successive vertex data. The successive vertex data preferably includes data for a plurality of vertices that may be considered to form a polygon strip (e.g., a triangle strip, which is a plurality of contiguous triangles). Each of the vertices are sequentially identified by a sequence number for sequential processing by the processor 308. As discussed below, the process controls the vertex processor 308 to begin processing a subsequent vertex while it is processing a prior vertex. Prior to the beginning of the process before point 400, a current vertex variable and subsequent variable are respectively set to be the first and second vertices in the graphics request stream.

The process begins at step 402 in which the current vertex is processed by the vertex processor 308. To that end, the vertex processor 308 retrieves the assembled current vertex data from the vertex assembler 302. The vertex processor proceeds by performing pre-processing instructions and some mathematical instructions on the vertex data. In preferred embodiments, the vertex processor 308 includes a wide array of plural processing elements for processing the graphics request stream. The processing elements preferably are arranged in parallel to facilitate parallel processing.

After pre-processing of the current vertex has finished, the processor begins mathematically intensive instructions at step 406. At a predetermined point during the mathematically intensive processing, a signal is sent to the vertex assembler 302 to start assembling the subsequent vertex in step 412. When a predetermined point in the instructions is reached, the vertex processor 308 retrieves the subsequent vertex data from the vertex assembler 302. The processor 308 retrieves vertex data from the vertex assembler 302 output port 306 which at this point is treated as the assembled vertex data of the subsequent vertex. In preferred embodiments, this predetermined line of instructions is reached after the mathematically intensive processing has occurred for the current vertex in step 406. In the next instruction line after the predetermined point, code exists for processing both the current vertex and the subsequent vertex. Pre-processing on the subsequent vertex occurs in step 408 at the same time that post-processing occurs on the current vertex in step 410. Since the instruction set for post-processing does not require the use of mathematically intensive hardware such as, a multiplier or a reciprocal unit, for example, and the instruction set for pre-processing only minimally requires the use of mathematically intensive hardware, the pre-processing of the subsequent vertex and the post-processing of the current vertex may occur at the same time. Thus, both the current vertex and subsequent vertex are being simultaneously processed by the vertex processor 308. Additionally, after the predetermined point in the instructions is reached, a headstart signal is sent to the vertex assembler in step 411. When the bit of flag 303 is set, the vertex assembler 302 determines if the vertex data for the subsequent vertex was properly assembled when it was retrieved from its output port 306.

The vertex assembler keeps track of all vertices that are assembled based upon the sequence number in step 416. If the subsequent vertex was not assembled when the headstart signal is received, a latch is set in step 420. If the subsequent vertex is assembled, a separate latch is set in step 422. Keeping track of whether a vertex has been assembled or not may be performed in multiple ways, which should be apparent to one skilled in the art. For example, the vertex assembler 302 may store the sequence number for a vertex along with data indicative of the status of assembly.

When the current vertex has finished the post processing, the vertex processor 308 sends a signal to the vertex assembler 302 in step 414. This notification causes the vertex assembler 302 in step 418 to check the state of the latches which were set in steps 420 and 422. If the subsequent vertex data was assembled properly, the processor continues to point 404 and continues to process the subsequent vertex, which is now the current vertex, by performing postprocessing in step 410. If, however, the vertex assembler 302 indicates that the subsequent vertex was not assembled when a request for the subsequent vertex was made from the vertex processor 308, the vertex assembler checks to see if the subsequent vertex is finished being assembled in step 424. If the subsequent vertex is not assembled, then the vertex assembler 302 causes the processor to idle while the subsequent vertex is assembled before returning to point 400.

The vertex assembler stores an instruction line number in a register, referred to hereinafter as a jump register, that the processor utilizes to determine which line of the instructions (referred to above) that the processor should process. The vertex assembler 302 updates the jump register at point 400 and at step 418. For example, the jump register may contain the setting for a zero at point 400. The processor accesses the jump register and reads a zero which indicates to the processor that the processor should sit at idle and wait for the vertex assembler 302 to set the jump register to an instruction line number. When the vertex assembler 302 has assembled a vertex, the jump register is set to a predetermined address, such as one, for example, indicating that the first instruction line should be executed.

At step 418, the vertex assembler 302 indicates whether the subsequent vertex was assembled and sets the jump register. Accordingly, if the subsequent vertex was not ready at the time of receipt of the headstart signal, the jump register will be set to a value which indicates that the first instruction should be executed on the subsequent vertex data at point 400. If the subsequent vertex was ready upon receipt by the vertex assembler 302 of the headstart signal, the vertex assembler 302 sets the jump register to the instruction line which is indicative of step 404 so that the mathematically intensive processing is begun on the subsequent vertex, since preprocessing has already been done.

In an alternative embodiment, the disclosed apparatus and method for processing vertices from a graphics request stream may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. An apparatus for processing computer graphics requests, the apparatus comprising:

a vertex assembler having an input for receiving graphics requests;

a processor, coupled to the vertex assembler, for processing graphics requests, the processor providing a headstart signal to the vertex assembler to indicate that the processor is processing a new graphics request, upon receipt of the headstart signal, the vertex assembler causing the processor to restart processing of the new graphics request if the new request is determined to have been not properly assembled.

2. An apparatus for processing computer graphics requests, the apparatus comprising:

a vertex assembler having an input for receiving graphics requests;

a processor, coupled to the vertex assembler, for processing graphics requests, the processor providing a headstart signal to the vertex assembler to indicate that the processor is processing a new graphics request while it is processing a previous graphics request, after receipt of the headstart signal and completion of processing the previous graphics request, the vertex assembler causing the processor to restart processing of the new graphics request if the new request is determined to have been not properly assembled.

3. The apparatus as defined by claim 2 wherein after receipt of the headstart signal and completion of processing the previous graphics request, the vertex assembler causes the processor to continue processing of the new graphics request without restarting if the new request is determined to have been properly assembled.

4. The apparatus as defined by claim 2 further comprising a flag for providing the headstart signal.

5. An apparatus for processing a computer graphics request stream, the graphics request stream including first vertex data followed by second vertex data, the apparatus comprising:

a vertex assembler having an input for successively receiving the first vertex data and the second vertex data, the vertex assembler assembling the first vertex data prior to assembling the second vertex data; and a processor, coupled to the vertex assembler, for processing the first vertex data and the second vertex data, the processor beginning processing of the second vertex data after beginning but prior to completing the processing of the first vertex data, the vertex assembler directing a message to the processor after completing processing of the first vertex data, the message indicating whether the processor must restart processing of the second vertex data.

6. The apparatus as defined by claim 5 wherein the message indicates whether the processor can continue processing the second vertex data without restarting.

7. The apparatus as defined by claim 5 wherein the vertex assembler includes a determiner for determining if the second vertex data was properly assembled when the processor began processing the second vertex data.

8. The apparatus as defined by claim 7 wherein the message indicates that the processor must restart processing the second vertex data if it is determined that the second vertex data was not properly assembled when the processor began processing the second vertex data.

9. The apparatus as defined by claim 5, further comprising:

a flag indicating that the processor has begun processing the second vertex data.

10. A method of processing vertex data having first vertex data and second vertex data, the method comprising:

A. processing assembled first vertex data;

B. beginning to process second vertex data prior to completing the processing of the first vertex data, the second vertex data being processed in accordance with a preselected process having a start portion;

C. determining, after completing the processing of the first vertex data, if the second vertex data was properly assembled when processing of the second vertex data began; and D. if it is determined in step C that the second vertex data was not properly assembled when processing of the second vertex data began, then reprocessing the second vertex data from the start portion of the preselected process.

11. The method as defined by claim 10 further comprising:

E. if it is determined in step C that the second vertex data was properly assembled when processing of the second vertex data began, then continuing processing of the second vertex data without returning processing to the start portion of the preselected process.

12. The method as defined by claim 10 wherein step B comprises:

B1. setting a flag indicating that the second vertex data is being processed prior to completing the processing of the first vertex data.

13. An apparatus for processing vertex data having first vertex data and second vertex data, the apparatus comprising:

a processor for processing assembled first vertex data;

the processor beginning to process second vertex data prior to completing the processing of the first vertex data, the second vertex data being processed by the processor in accordance with a preselected process having a start portion, a determiner for determining, after completing the processing of the first vertex data, if the second vertex data was properly assembled when processing of the second vertex data began, the processor reprocessing the second vertex data from the start portion of the preselected process if it is determined that the second vertex data was not properly assembled when processing of the second vertex data began.

14. The apparatus as defined by claim 13 wherein the processor continues processing the second vertex data without returning processing to the start portion of the preselected process if it is determined that the second vertex data was properly assembled when processing of the second vertex data began.

15. The apparatus as defined by claim 13 further comprising:

a flag that when set, indicates that the second vertex data is being processed prior to completing the processing of the first vertex data.

16. An apparatus for processing consecutive first and second vertices, the apparatus comprising:

a vertex assembler for assembling vertex data; and a processor for processing vertices in accord with processing instructions, the processor including a jump register for processing the second vertex after completing processing of the first vertex, the vertex assembler capable of setting the jump register to a predetermined address depending on if the subsequent vertex was properly assembled when first pre-processed, the processor jumping to the predetermined address contained in the jump register.

17. A computer program for processing assembled first vertex data and second vertex data wherein the second vertex data is subsequent to the first vertex data, on a computer readable medium, the computer program comprising:

computer code for processing assembled first vertex data;

computer code for pre-processing the second vertex data and post-processing assembled first vertex data simultaneously;

computer code for determining, after completing the post-processing of the assembled first vertex data, if the second vertex data was properly assembled upon pre-processing of the second vertex data; and computer code for pre-processing assembled second vertex data if it is determined in the computer code for determining that the second vertex data was not properly assembled upon preprocessing of the second vertex data.

18. The computer program according to claim 17, further comprising:

computer code for processing the second vertex data if it is determined that the second vertex data was properly assembled upon pre-processing of the second vertex data.

19. The computer program according to claim 18, wherein, the computer code for processing the second vertex data is code which returns to the computer code for processing assembled first vertex data and wherein the second vertex data becomes the first vertex data.

20. The computer program according to claim 18 further comprising computer code for setting a flag indicating that the second vertex data is being pre-processed prior to completing the post-processing of the assembled first vertex data.

21. The computer program according to claim 19, wherein the computer code for processing includes code for utilizing mathematically intensive hardware.

* * * * *